United States Patent Office 3,373,530
Patented Mar. 19, 1968

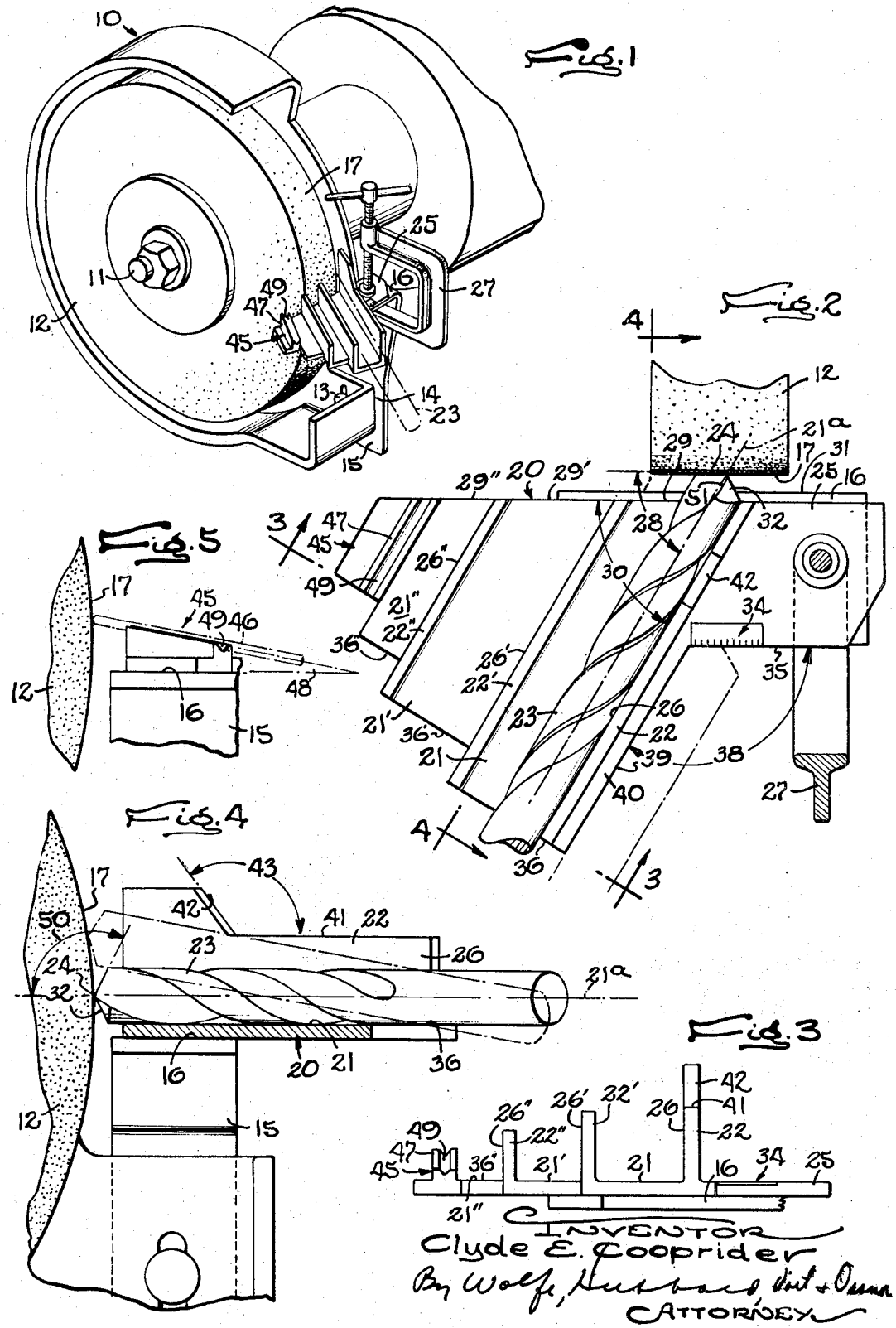

3,373,530
SHARPENING FIXTURE FOR TWIST DRILLS
Clyde E. Cooprider, R.R. 1, Rochelle, Ill. 61068
Continuation-in-part of application Ser. No. 386,299,
July 30, 1964. This application July 30, 1965, Ser.
No. 476,027
1 Claim. (Cl. 51—238)

ABSTRACT OF THE DISCLOSURE

A fixture attachable to the steady rest of a wheel type grinder including a generally flat plate having a plurality of upstanding flanges inclined relative to the forward edge of the plate at a conventional drill tip angle. The opposite end of the plate is stepped to provide fulcrums differently spaced from the front edge of the plate and providing fulcrums for accommodating different lengths of drills during sharpening.

---

This application is a continuation-in-part of my copending application Ser. No. 386,299, filed July 30, 1964.

This invention relates to a fixture for facilitating the sharpening of twist drills and the primary object is to provide a fixture which is of novel and exceedingly simple construction, adapted to be clamped to the rest of an ordinary grinder, locate each cutting edge of a drill being sharpened relative to the periphery of the grinder, and accurately guide the manually actuated movements of the drill to effect the sharpening and formation of the desired relief on the cutting edge.

A more detailed object is to provide for locating the drill tip relative to the grinding wheel and provide for locating and guiding of the tip by engagement of the drill shank with three surfaces on a simple angle bar clamped to the tool rest of the grinder.

Another object is to adapt the fixture for handling a wide variety of sizes and diameters of drills.

A further object is to provide for easy sharpening of drills of small diameter.

Other objects and advantages of the invention will become apparent from the following detailed description taken in connection with the accompanying drawings, in which FIGURE 1 is a fragmentary perspective view of a standard bench grinder equipped with a sharpening fixture embodying the novel features of the present invention.

FIG. 2 is a fragmentary plan view.

FIG. 3 is an end view taken along the line 3—3 of FIG. 2.

FIG. 4 is a fragmentary section taken along the line 4—4 of FIG. 2.

FIG. 5 is a left side view.

The improved fixture is intended for use with a so-called bench grinder having a housing 10 in which a shaft 11 is journaled intermediate its ends and carries at one end a grinding wheel in the form of a disk 12 of bonded abrasive. A bracket 15 swingable on a pivot 13 is clamped against a vertical surface 14 on the housing and has at its upper end a plate 16 which projects laterally and horizontally across the cylindrical periphery 17 of the grinding wheel. The plate may be swung about the horizontal pivot 13 formed by the clamp screw and thus located at different desired angles according to the angle at which the work is to be disposed during grinding thereof.

The fixture constituting the present invention comprises a rigid plate 20 adapted to be clamped at its forward end against the top of the rest plate 16 of the grinder and having a flat top surface 21 cooperating with an upstanding perpendicular guide flange 22 along one side 26 against which the drill 23 is held and guided while a cutting edge 24 is being sharpened by upward swinging of the drill shank about a fulcrum 36 normal to the guide surface 26 and spaced from the tip of the drill a distance less than the length of the drills to be sharpened. The plate 20 and the flange 22 may be those of a standard right angle bar of appropriate size or the entire fixture may be a single piece molding of any suitable material.

To facilitate clamping of the fixture detachably and in proper angular position against the top of the tool rest 16, a flat arm 25 constituting an extension of the bottom plate 20 projects laterally from the forward end of the plate and, by means of an ordinary screw type C clamp 27, the arm 25 may be fastened detachably against the top of the rest plate 16 in a position to locate the guide surface 26 properly relative to the grinding wheel as shown in FIGS. 1 and 2.

To establish the angle 28 relative to the drill axis 21a at which each cutting lip or edge 24 of the drill is to be disposed during the sharpening operation, the forward edge 29 of the plate 20 is disposed at an included angle 30 relative to the guide surface 26 equal to the angle 28. In most standard drills for use on materials such as steel, this angle is 59 degrees. Preferably the end 29 extends across the full width of the bottom plate and arm 25. By clamping the plate 20 to the rest plate 16 of the grinder with the edge 29 parallel to the inner edge 31 of the tool rest, the side guide surface 26 is inclined relative to the plane of the grinding wheel at the conventional angle 30 of 59 degrees to which the cutting edges 24 of the drill are to be disposed after sharpening. The plate is positioned along the rest 16 so that the end of the drill is disposed between the sides of the grinding wheel for contact of the full width of the cutting edges 24 with the periphery 17 of the wheel.

In accordance with the present invention, each cutting edge of the drill is ground away and sharpened by positioning the drill in the right angular seat formed by the top 21 of the base plate 20 and the flange 22 and then rocking the drill upwardly about the fulcrum 36 which is disposed intermediate the ends of the drill and extends perpendicular to the guide surface 26. Herein, this fulcrum is defined by the outer end of the bottom plate 20. It is spaced from the inner end 29 of the seat 21, 26 a distance such that as an incident to the upward swinging of the drill with one cutting edge 24 pressed against the wheel periphery 17, a relief surface 32 (FIG. 4) at the proper angle will be formed on the drill tip behind the sharpened cutting edge. The relief angle may vary considerably without interfering with the cutting efficiency of the drill so that the fixture as described above and of a given length will accommodate a substantial range of drill lengths.

To sharpen a drill, the tool rest 16 of the grinder is disposed substantially horizontally and the arm 25 is clamped against the rest as shown with the end edge 29 of the plate 20 parallel to the inner edge 31 of the rest and the inner end of the side 26 of the guide flange spaced from the left side of the grinding wheel a distance greater than the radial length of the cutting edges 24 on the drill to be sharpened. The drill is placed firmly, as shown in full in FIGS. 2 and 4 and in phantom in FIG. 1, in the right angular seat formed by the guide surface 26 and the top of the plate 20 and turned about its axis 21a until one of the lips or cutting edges 24 is disposed horizontally. Then the drill is pushed forwardly to bring the cutting edge 24 into contact with the wheel periphery 17 to remove an amount of stock sufficient to sharpen the edge. With the drill end held pressed against the wheel periphery, the drill is rocked upwardly about the fulcrum 36 as shown in phantom in FIG. 4 while holding the side of the drill firmly against the side 26 of the guide flange 22. The extent of this upwardly swinging is sufficient to include the full circumferential width of the relief surface 32.

The same procedure is followed in sharpening the second cutting edge of the drill. In order to determine the extent of stock removed in the sharpening of the two edges and check the uniformity in the radial lengths of these edges, scale graduations 34 are formed along the outer edge 35 of the arm 25, this edge being disposed parallel to the forward edge 29 of the plate. Also, the edge is disposed relative to the guide surface 26 of the guide flange 22 opposite the guide surface at an angle 38 which is the complement of the angle 28, that is, at an angle of 121 degrees. Herein, this angle is defined by the edge 35 and the outer side face 39 of a narrow flange 40 lying in the plane of the plate 20 and along the outer side of the flange 22. By laying the sharpened drill against the surface 39 as shown in phantom in FIG. 2 with the sharpened edges disposed successively in abutment with the scale surface 35, the radial lengths of the two edges may be compared thus determining whether these lengths are equal and whether more stock should be removed from one of the edges to equalize their lengths and thus make the intersection of these edges coincident with the axis of the drill.

The upper edge of the flange 22 is contoured for use in checking the extent of the relief or clearance formed on and around the surface 32 in a sharpening operation as above described. For this purpose, the upper edge of the flange 22 is cut away to form a surface 41 parallel to the top surface 21 and the drill in the starting position (FIG. 4). An upwardly inclined edge 42 is formed at the inner end of the edge 41 making therewith an included angle 43 of 126 degrees which is the desired five degrees greater than the 121-degree angle 50 that is included between cutting lip 24 and the drill axis after sharpening. By laying the sharpened drill along the edge 41 with the heel 51 of the clearance face 32 disposed in the plane of the edge 42, this heel will lie substantially in full abutment with the edge 42 if the correct relief has been formed on the face 32. It will be observed that the amount of such relief formed in the sharpening operation is determined by which of the fulcrums 36 is used in the pivoting of the drill and also by the extent of the upward swinging. By selecting the proper combination of these factors, the proper heel clearance can be achieved.

In another of its aspects, the invention contemplates the addition of one or more additional angular seats 21, 26 of the character above described but made of narrow widths and shorter lengths to better accommodate drills of smaller diameters and shorter lengths. In the present instance, two additional seats 21', 26' and 21", 26" are provided by enlarging the base plate 20, providing additional upstanding right angular flanges 22', 22" thereon. The forward edges 29', 29" of the seat bottoms 21' 21" are continuations of the edge 29 and alined therewith. The seats are made shorter by stepping the fulcrum edges 36', 36" closer to the edge 29. Also, by spacing the flanges 22', 22" different distances from the adjacent flange, the seats 21', 26' and 21", 26" may be made narrower thus enabling the base plate 20 to be made of minimum width while still accommodating the desired number of parallel seats. Selection of the angular seat to be used in guiding the sharpening of a particular drill is usually determined by the length of the drill, the seat selected being substantially shorter than the length of the drill shank as illustrated in phantom in FIG. 2.

In still another of its aspects, the invention contemplates the formation of the base plate 20 of another type of fixture indicated generally at 45 for supporting drills 46 of very small diameters, for example, less than one-eighth inch, and sharpening the cutting edges thereof with a flat instead of a round clearance face disposed at a satisfactory clearance angle of, for example, 12 degrees. For this purpose, a flange 47 is cast integral with the base plate 20 to the left of the flange 22" and the portion 21" thereof with the top of the flange inclined forwardly and upwardly relative to the plate at the desired clearance angle 48, such as 12 degrees, to be formed in sharpening small diameter drills. To receive the shanks of such drills and hold the latter in position to sharpen the cutting edges at the desired 59-degree angle, the top of the flange is formed with a groove 49 of V-shaped cross-section in which the shank of the small size drill is held firmly seated during sharpening.

To sharpen such a small drill, the base plate 20 is shifted along the rest 16 and clamped to the latter with the groove 49 intersecting the periphery 27 of the grinding wheel. Then, with one cutting edge of the drill disposed horizontally as before, it is only necessary to advance the drill along the groove 49 and into contact with the grinding wheel periphery. This procedure is repeated after turning the drill in the groove to present the other cutting edges in proper sharpening position.

It will be apparent that the present sharpening fixture, although extremely simple in structure and operation, is capable, even when used by an unskilled operator, of effecting the sharpening of conventional drills of all sizes and lengths with an accuracy sufficient for most drilling operations. The accuracy achieved has been found to approach closely that achieved by costly automatic drill sharpening machines.

I claim as my invention:

1. A fixture for sharpening twist drills of different sizes and lengths comprising a base plate, a plurality of parallel guide flanges upstanding from the plate and laterally spaced apart to receive between them different drills to be sharpened, means by which one end of said plate may be clamped against the horizontal tool rest of a grinder and disposed in front of and extending across the periphery of the grinding wheel with said flanges disposed vertically and the end of said plate adjacent said wheel disposed at an included angle relative to the planes of said guide flanges equal to the angle included between the lip and axis of the drills to be sharpened, and a plurality of steps formed on the opposite end of said plate adjacent the respective flanges and each extending crosswise substantially at right angles to said flanges but spaced different distances from said first plate end whereby to form fulcrums for guiding the upward swinging of the tip of the drills of different lengths while the lips of the respective drills, when being sharpened individually, are in contact with said wheel periphery and the side of the drill is held against the adjacent one of said guide flanges.

References Cited

UNITED STATES PATENTS

| | | | |
|---|---|---|---|
| 288,069 | 11/1883 | Landers | 51—219 X |
| 1,052,073 | 2/1913 | Mallory | 51—219 |
| 1,920,537 | 8/1933 | Ward | 51—239 |
| 1,944,540 | 1/1934 | Bailey | 51—219 |
| 2,800,755 | 7/1957 | Perra | 51—219 X |
| 3,089,290 | 5/1963 | Warm-Reithmayer | 51—219 X |
| 3,121,983 | 2/1964 | English | 51—219 |

HAROLD D. WHITEHEAD, *Primary Examiner.*